Sept. 28, 1948.  A. F. STONE ET AL  2,450,211
CHAIN-SAW BAR CONDITIONER
Filed Jan. 31, 1947  2 Sheets-Sheet 1
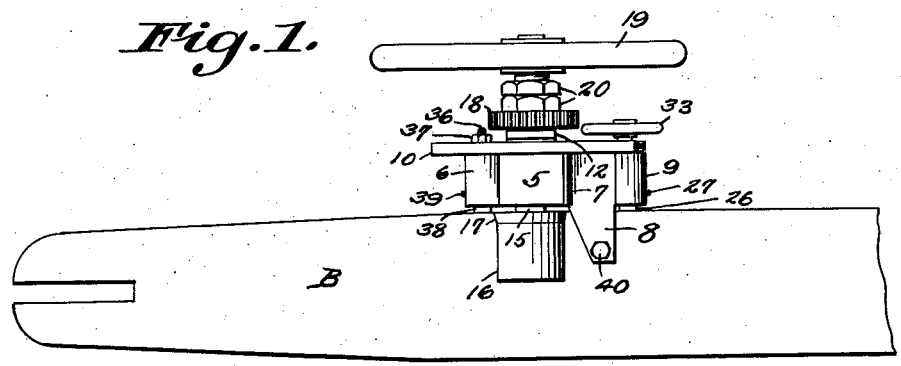
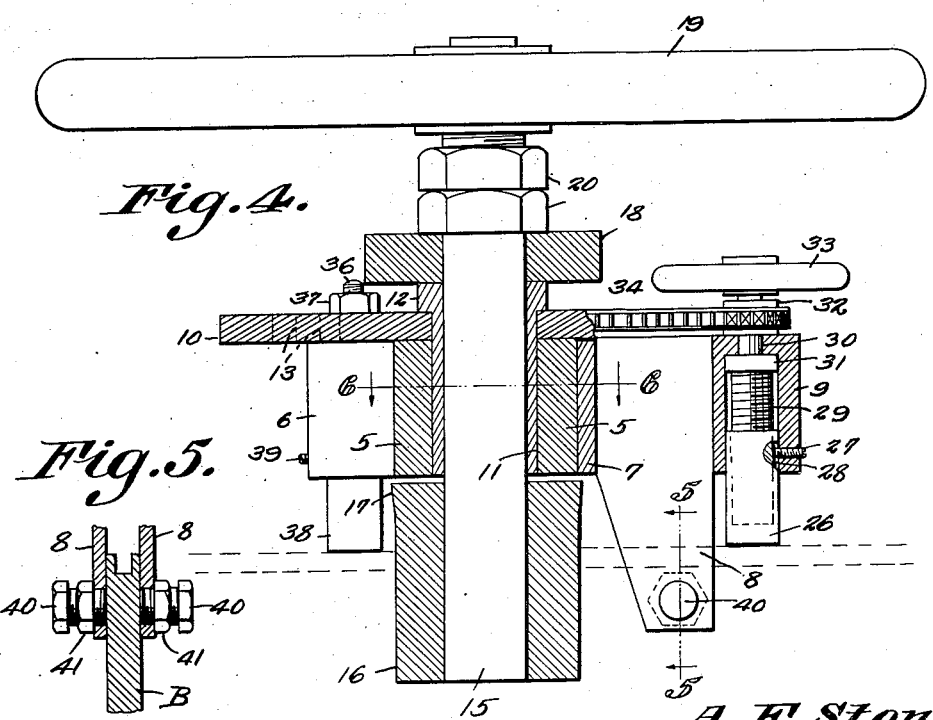
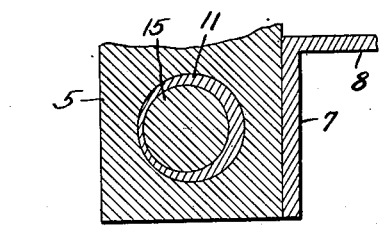
A. F. Stone
E. A. Hayden
Inventors.
By CA Knowles
Attorneys.

Sept. 28, 1948.                A. F. STONE ET AL                2,450,211
                            CHAIN-SAW BAR CONDITIONER
Filed Jan. 31, 1947                                          2 Sheets-Sheet 2
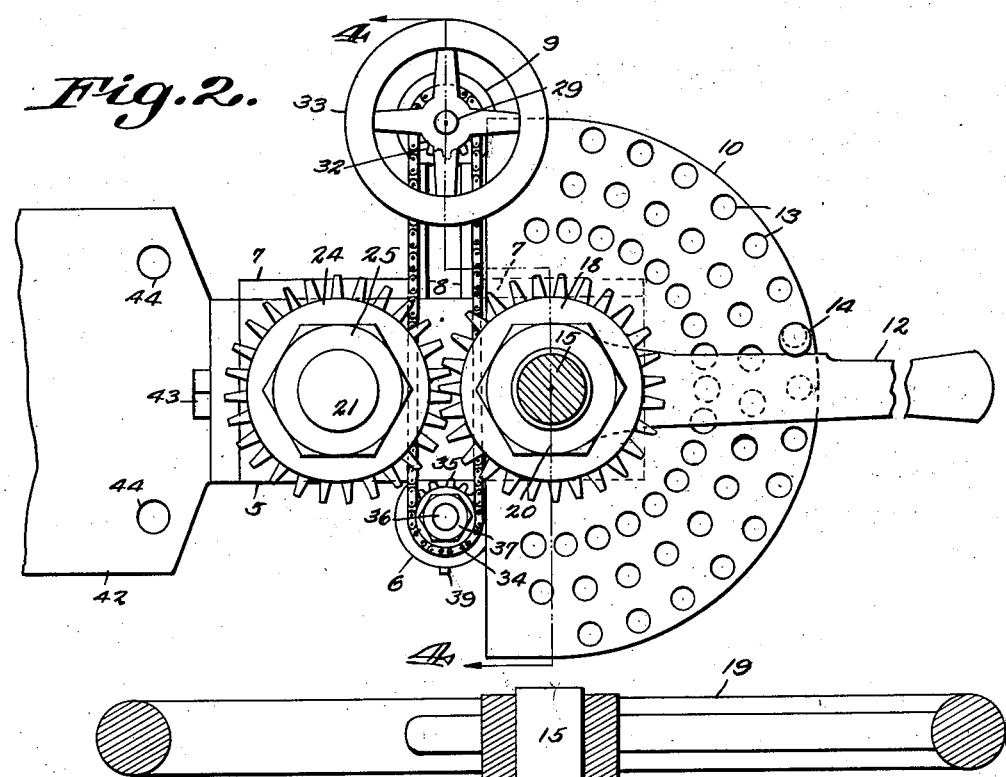
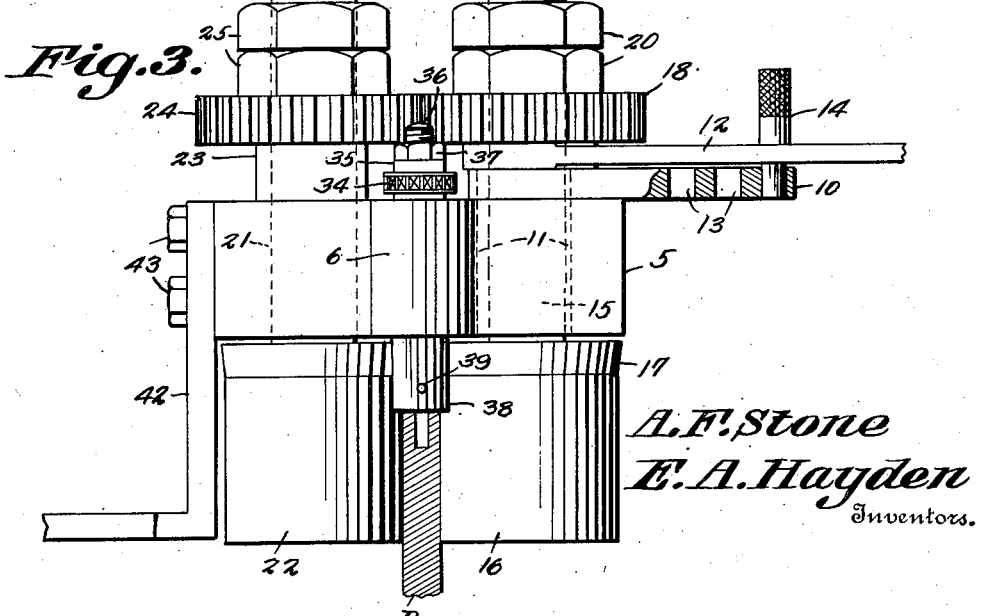
A. F. Stone
E. A. Hayden
    Inventors.

Patented Sept. 28, 1948

2,450,211

UNITED STATES PATENT OFFICE 2,450,211

CHAIN-SAW BAR CONDITIONER

Albert F. Stone and Ernest A. Hayden,
Callahan, Calif.

Application January 31, 1947, Serial No. 725,696

8 Claims. (Cl. 153—28)

1

This invention relates to a machine designed to maintain in proper condition the edge of a chain-saw bar, these bars being a part of chain-saws, such as are commonly used in felling timber.

By way of background, it is pointed out that in lumbering operations, the lumbering crews quite commonly use chain-saws in felling timber. Saws of this type are equipped with chain-saw bars, of flat and elongated formation. Around the edge of the chain-saw bar, a slot is provided, which carries the chain-saw.

By reason of the heavy use to which chain-saws are quite generally subjected, the slotted edge of the chain-saw bar tends in time to become worn, that is, the slots become too wide, and this results in the saw teeth on the chain leaning over out of line during operation of the chain-saw.

It is pointed out in this connection that as soon as a slot in a chain-saw bar begins to widen, thereafter, the wear on the slotted edge increases very rapidly. In a bar in which this has occurred, great difficulty is encountered in maintaining the chain-saw in proper operating condition, since, if the saw is running in a worn chain-saw bar, it will, in time, bind during cutting operations, resulting in inability to finish the cut.

Heretofore, when the slotted edge of a chain-saw bar has become worn in the manner described, it has been the general practice either to discard the bar in favor of a new one, or, alternatively, to narrow the slot to a point where the chain will run without binding, by hammering the edge of the bar. It has been found that this takes considerable time, that it is difficult to do a satisfactory job in repairing the bar, and that much time is lost to the crew by reason of the necessity of making repairs in this manner.

The practice of hammering worn bars has, however, continued, in view of the fact that bars of this type are quite expensive.

The primary object of this invention is to provide an apparatus which is specifically designed to maintain a chain saw bar in proper condition, the apparatus being so constructed as to quickly and accurately narrow the slot of a worn bar, and, additionally, to prevent the slot of a bar in proper condition from widening.

It has been the experience of those skilled in the art that the use of such apparatus to maintain a new bar in proper condition will result in the felling of 15 to 20 percent more timber by a lumber crew than would otherwise be possible.

It is a further important object of the invention to provide an apparatus of this type which is portable, and can be used on the site at which

2 the timber is being felled, thereby saving valuable time.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 1 is a side elevational view of a chain-saw bar conditioner constructed in accordance with the invention, with a chain-saw bar being passed therethrough, part of the bar being broken away.

Figure 2 is a top plan view, a hand wheel embodied in the invention being removed.

Figure 3 is a front elevational view, in which parts are shown in section.

Figure 4 is a sectional view taken on line 4—4 of Figure 2, the dotted lines indicating the position which would be taken by the slotted edge of a chain-saw bar being passed through the device.

Figure 5 is a detail sectional view, taken on line 5—5 of Figure 4, of means embodied in the invention for guiding the saw bar through the device.

Figure 6 is a detail transverse sectional view, taken on line 6—6 of Figure 5, of an eccentric bushing embodied in the invention.

Referring to the drawings in detail, the reference character 5 denotes a rectangular block. To the front surface of the block 5, and intermediate its end, is vertically secured, by welding or the like, a substantially cylindrically front sleeve 6. Against the rear surface of the block 5 are similarly secured opposed angular plates 7, these plates being formed with ears 8 that are extended from the rear surface of the block 5 at a right angle thereto, and which have lower ends extending a considerable distance below the lower surface of the block, this construction being best shown by Figures 1 and 4. These ears 8 are identically formed, and are extended from the block in spaced parallel relation to each other.

To the outer edges of the ears 8 is secured, by welding or the like, a rear sleeve 9 which in form is like the front sleeve 6. The block 5, front sleeve 6, angular plates 7 having ears 8, and the rear sleeve 9, together constitute the supporting frame of the device.

Fixedly secured to the upper surface of the block 5, at one end thereof, is a large semi-circular plate 10. This plate is formed with a large centrally disposed opening that registers with a vertical bore formed in the block 5, and rotatably mounted in said opening and bore is an eccentric bushing 11. At its upper end, the eccentric bushing 11 is integral with, or fixedly secured to, a lever 12.

Lever 12 has its free end projecting beyond the periphery of the semi-circular plate 10, the lever being laterally swingable across the face of the plate. For reasons which will be described in detail hereinafter, a plurality of perforations 13 are provided in the plate 10, as clearly shown by Figure 2. These perforations are preferably arranged in arcuate rows, corresponding to the conformation of the plate, there being an inner row in which the perforations are arranged in closely spaced relation, an intermediate row in which they are spaced somewhat further apart, and an outer row in which they are spaced relatively widely.

An eccentric pin 14 is provided which is removably insertable in any one of these perforations 13, in order that the lever 12 may be held tightly in any position to which it may be moved across the plate. This is accomplished by moving the lever 12 to the position desired, inserting the eccentric pin 14 in the most suitable perforation 13, and turning the eccentric or offset upper portion of the pin until it bears tightly against the side of the lever, thereby holding the lever in proper position.

Rotatable in the eccentric bushing 11 is a shaft 15 to the lower end of which is fixedly secured a roller 16. The roller 16 is cylindrical in shape for most of its length, but is flared outwardly to a slight degree at its upper end 17.

On the portion of the shaft 15 that extends above the lever 12 is mounted a gear wheel 18, which is held to the shaft for rotation therewith by any suitable means, as by being keyed thereto, and at the upper end of the shaft is mounted hand wheel 19. Immediately below the hand wheel 19, the shaft 15 is threaded, so as to receive lock nuts 20, whereby the gear wheel 18 may be securely locked to the shaft 15.

In the other end of the block 5 is provided a second vertical bore in which is rotatable the shaft 21, carrying on its lower end roller 22 that is formed similarly to the roller 16. Shaft 21 is also provided with a spacing collar 23 where it extends from the upper surface of the block 5, and on the spacing collar 23 is mounted gear 24, which is keyed to shaft 21 for rotation therewith, and is in continuous mesh with gear 18.

Lock nuts 25 are threadable on the upper end of the shaft 21, and serve the same purpose as the lock nuts 20 threadable on shaft 15.

The rear sleeve 9, as clearly shown by Figure 2, is provided with a cylindrical bore opening from the lower end thereof, and into this bore is inserted a hollow plug 26. The plug 26 is free to move up and down in the sleeve 9, but is held from rotation therein by threaded pin 27 threadable into an opening in the side wall of the sleeve, and extending into a vertical slot 28 in the side wall of the plug.

Threadable in the plug 26 is a threaded shaft 29 that is journaled in an opening 30 in the closed upper end of the sleeve 9, and which is held against up-and-down movement by a collar 31 which is fixedly secured thereto, and which bears against the lower surface of the upper end of the sleeve.

Cooperating with the collar 31 in preventing up-and-down movement of the threaded shaft 29 is a sprocket 32 mounted on the shaft 29 on the portion thereof, that projects above the rear sleeve 9.

At its upper end, the threaded shaft 29 carries a small hand wheel 33. Thus, it is seen that by operation of the hand wheel 33, the plug 26 is adjustably moved up or down in relation to the rest of the apparatus.

Around the sprocket 32 passes a chain 34, that also passes around a sprocket 35, mounted on a threaded shaft 36 by means of nut 37. This second threaded shaft 36 is journaled in the front sleeve 6, and is adapted to adjustably position plug 38. By reason of the sprocket and chain connection of the shaft 36 with the shaft 29 at the opposite side of the block 5, it is seen that operation of the hand wheel 33 adjusts both plugs simultaneously. Threaded pin 39 prevents rotation of the plug 38 in the sleeve 6.

At the lower ends of the ears 8, which, as clearly shown by Figures 1 and 4, extend considerably below the lower ends of the plugs 26 and 38, opposed threaded openings are provided in the ears in which are threadable guide screws 40, carrying lock nuts 41.

The completely assembled chain-saw bar conditioner is particularly designed for use at the forest location of the lumbering operations. Accordingly, an angular mounting bracket 42 is provided, that is secured by bolts 43, extending through one face of the bracket, to the block 5. The bracket 42 has openings 44 in its other face whereby the bracket may be bolted to the flat surface of a stump or the like, thereby mounting the device ready for operation.

In operation of the chain-saw bar conditioner, it is first mounted as hereinbefore described. The rollers 16 and 22, at this point of the operation, are spaced widely apart, the lever 12, carrying eccentric bushing 11, being moved to a position adjacent the small hand wheel 33 for this purpose. The gears 18 and 24 are similarly widely spaced apart at this point, and are in loose mesh, as shown, for example, by Figure 2.

The small hand wheel 33 is then operated to adjust the plugs 26 and 38 to the point shown approximately in Figure 4. A chain-saw bar, which has been designated by the letter of reference B, is then passed between the ears 8 preparatory to being passed between the rollers 16 and 22. The guide screws 40 on the ears are then threaded against the side of the bar, to serve as a guide, to hold the bar in proper relation to the rollers while being passed between the rollers.

Through experience in operation of a chain-saw bar conditioner constructed in accordance with our invention, we have found that before the plugs 26 and 38 are connected for simultaneous adjustment by means of the sprocket and chain arrangement described, the plug 38, at the front of the machine, should be moved slightly downwardly, so that its lower surface is positioned a little below the lower surface of the rear plug 26. This results in the upper edge of the bar B, which is held against the lower surfaces of these plugs being passed through the machine, being maintained during the operation at a slight angle, preferably about 1 degree to 1½ degrees, to a plane drawn perpendicularly to the axis of the rollers 16 and 22.

Through experience, it has been found that this causes the machine to bear downwardly on the bar B as the pass is being made, resulting in the plugs 26 and 38 pressing tightly upon the upper edge of the bar. This feature causes the machine to hold down and grip the bar when the flared portions 17 of the rollers come into contact with the edge of the bar, thereby pressing the walls of the slot in the bar together. There is necessarily some vertical slippage by reason of the angle of the edge of the bar to the line of direction of rotation of the rollers, but it has been found that this is no detriment to successful operation.

When the bar B has been inserted between the rollers 16 and 22, the lever 12 is laterally moved so as to traverse the plate 10 until the eccentric bushing 11, carrying shaft 15 on which the roller 16 is mounted, causes the roller 16 to be moved toward the roller 22, compressing the bar B tightly therebetween.

Eccentric pin 14 is then applied to the nearest suitable perforation 13 in the plate 10, and is turned against the side of the lever 12, thereby holding the lever in its desired position, and maintaining the roller 16 in exact spaced relation from the roller 22. Even and exact pressure is therefore applied against either side of the slotted edge of the bar B, while it is being passed between the rollers.

The bar B is passed between the rollers 16 and 22 manually, and is held against the bottoms of the plugs 26 and 38 during the operation, in order that it may at all times be held in proper relation to the rollers. It is preferably passed through several times. On the first occasion, the plugs are adjusted to the position shown in Figure 4, and it is seen that this results in the chain-saw bar B being compressed between the cylindrical portion of the rollers when it is passed through.

On each succeeding occasion, however, the small hand wheel 33 is operated to raise the plugs slightly before the bar is passed between the rollers, resulting, finally, in the slotted edge of the bar being passed between the flared upper ends 17 of the rollers.

It follows that even more pressure is thus applied to the edge of the bar, when the bar is passed between the flared portions.

To pass the bar between the rollers, the bar is held manually, while the hand wheel 19 is turned, and since the gears 18 and 24 are now in close mesh, this simultaneously and evenly rotates the rollers in opposite directions, causing the bar to be moved therebetween.

It has been found from experience that the slotted edge of a new bar, if conditioned in this manner, as soon as a perceptible widening of the slot is observed, will be maintained in excellent condition, and the life of such a bar will be greatly prolonged. At the same time, it has been found extremely advantageous to regularly condition the bar on periodic occasions, as for instance, after a specified number of hours of use, even though no perceptible widening of the slot is seen.

It is further pointed out that although a mounting bracket has been herein described, whereby the apparatus may be secured to a stump, other modes of use are possible. As an example, the chain-saw bar may be secured in a vise. The apparatus may then be tightened to the bar in the manner hereinbefore described, and by operation of the hand wheel 19, can traverse the length of the chain-saw bar while the bar is held stationary in the vise.

What is claimed is:

1. A conditioner for chain-saw bars, comprising a block, an eccentric bushing mounted for rotation in the block, a lever fixedly connected to the eccentric bushing, means for holding the lever in positions of laterally swingable adjustment, a shaft rotatable in the eccentric bushing, a second shaft rotatable in the block, flared rollers on the shafts, said rollers being spaced to receive, for passage between the flared portions thereof, a chain-saw bar, means for simultaneously rotating the shafts in opposite directions, adjustable plugs carried by the block at opposed sides of the rollers and in a common plane with said bar, and means adapted to adjust said plugs against the bar simultaneously and in equal amounts, whereby to engage the bar and maintain it in predetermined positions of adjustment in relation to the rollers while being passed therebetween.

2. A conditioner for chain-saw bars, comprising a block, an eccentric bushing mounted for rotation in the block, means for adjusting the position of the bushing by rotatable movement thereof, a shaft rotatable in the bushing, a second shaft rotatable in the block, portions of said shafts projecting beyond one face of the block, rollers flared at one end carried by the projecting portions of the shafts, said rollers being spaced to receive, for passage between them, a chain-saw bar, means for simultaneously rotating the shafts in opposite directions, adjustable guide plugs extending from said face of the block and disposed at opposite sides of the rollers, said plugs being mounted on the block for adjustment in paths parallel to the axes of the rollers, one of the plugs being positioned in a lower plane than the other, and means adapted to adjust said plugs for engagement with the bar simultaneously and in equal amounts, whereby to position the bar adjustably in relation to the rollers.

3. A conditioner for chain-saw bars, comprising a block, an eccentric bushing mounted for rotation in the block, a lever fixedly connected to the eccentric bushing, a perforated plate secured to the block, the lever being swingable across the plate, an eccentric pin removably insertable in any one of the perforations in said plate, the pin being adapted to be turned against the lever, whereby to hold the lever in position of laterally swingable adjustment, a shaft rotatable in the eccentric bushing, a second shaft rotatable in the block, rollers on the shafts, said rollers being spaced to receive, for passage between them, a chain-saw bar, means for simultaneously rotating the shafts in opposite directions, and means for maintaining the chain-saw bar in pre-determined positions of adjustment in relation to the rollers while being passed therebetween.

4. A conditioner for chain-saw bars, comprising a block, an eccentric bushing mounted for rotation in the block, a lever fixedly connected to the eccentric bushing, means for holding the lever in positions of laterally swingable adjustment, a shaft rotatable in the bushing, a second shaft rotatable in the block, flared rollers on the shafts, said rollers being spaced to receive, for passage between the flared portions thereof, a chain-saw bar, gears connecting the shafts for simultaneous rotation in opposite directions, vertically adjustable guide plugs carried by the block at opposite sides of the rollers and above the bar, one of said plugs being in a lower horizontal plane than the other, and means adapted to adjust said plugs simultaneously and in equal amounts, whereby to maintain the chain-saw bar in pre-determined positions of adjustment in relation to the rollers while being passed therebetween.

5. A conditioner for chain-saw bars, comprising a block, an eccentric bushing mounted for rotation in the block, a lever fixedly connected to the eccentric bushing, means for holding the lever in positions of laterally swingable adjustment, a shaft rotatable in the bushing, a second shaft rotatable in the block, rollers on the shafts, said rollers being spaced to receive, for passage between them, a chain-saw bar, means for simultaneously rotating the shafts in opposite directions, sleeves secured to the block, said sleeves being open at one end, hollow plugs slidable in the sleeves, the plugs projecting from the open ends of the sleeves, threaded shafts mounted in the sleeves for threadable engagement with the plugs, and means operatively connecting said shafts for simultaneous rotation.

6. A conditioner for chain-saw bars, comprising a block, an eccentric bushing mounted for rotation in the block, a lever fixedly connected to the eccentric bushing, a perforated plate secured to the block, the lever being swingable across the plate, an eccentric pin removably insertable in any one of the perforations, said pin being adapted to be turned against the lever, whereby to hold the lever in positions of laterally swingable adjustment, a shaft rotatable in the bushing, a second shaft rotatable in the block, rollers on the shafts, said rollers being spaced to receive, for passage between them, a chain-saw bar, gears connecting the shafts for simultaneous rotation in opposite directions, sleeves secured to the block, said sleeves being open at one end, hollow plugs slidable in the sleeves, said plugs projecting from the open ends of the sleeves, threaded shafts mounted in the sleeves for threadable engagement with the plugs, and means operatively connecting said shafts for simultaneous rotation.

7. A conditioner for chain-saw bars, comprising a block, an eccentric bushing rotatable therein, means for rotatably adjusting the bushing within the block, a shaft rotatable in the bushing, a second shaft rotatable in the block, portions of said shafts projecting beyond one face of the block, flared rollers on the projecting portions of the shafts, said rollers being spaced to receive, for passage between the flared portions thereof, a chain-saw bar, bar-engaging guide plugs carried by the block at opposite sides of the rollers, said plugs extending from said face of the block and being mounted on the block for adjustment in paths parallel to the axes of the rollers, an operative connection extending between the plugs adapted to adjust the plugs simultaneously and in equal amounts, and means for effecting pre-adjustment of each plug separately prior to said simultaneous adjustment, whereby to position one of the plugs in a different plane prior to simultaneous adjustment thereof against the bar.

8. A conditioner for chain-saw bars, comprising a block, spaced shafts rotatably mounted therein, portions of said shafts projecting beyond one face of the block, means for adjusting the distance between the shafts, flared rollers on the projecting portions of the shafts, said rollers being spaced to receive, for passage between the flared portions thereof, a chain-saw bar, bar-engaging guide plugs carried by the block at opposite sides of the rollers, said plugs extending from said face of the block and being mounted on the block for adjustment in paths parallel to the axes of the rollers, an operative connection extending between the plugs adapted to adjust the plugs simultaneously and in equal amounts, and means for effecting pre-adjustment of each plug separately prior to said simultaneous adjustment, whereby to position one of the plugs in a different plane prior to simultaneous adjustment thereof against the bar.

ALBERT F. STONE.
ERNEST A. HAYDEN.

REFERENCES CITED

The following references are of record in the file of this patent:

UNITED STATES PATENTS

| Number | Name | Date |
|---|---|---|
| 537,429 | Alexander | Apr. 16, 1895 |
| 582,863 | Jones | May 18, 1897 |
| 733,131 | Blumer | July 7, 1903 |
| 886,214 | Houck | Apr. 28, 1908 |
| 1,207,349 | Wagner | Dec. 5, 1916 |
| 2,106,866 | Best | Feb. 1, 1938 |